Patented Aug. 10, 1926.

1,595,675

UNITED STATES PATENT OFFICE.

REISSUED

JONAS HJALMAR MELLQUIST, OF STOCKHOLM, SWEDEN.

METHOD OF APPLYING PROTECTIVE LAYERS ON METALS OR OTHER ELECTRIC CONDUCTORS.

No Drawing. Application filed August 1, 1924, Serial No. 729,656, and in Sweden August 23, 1923.

It is known that iron is rendered passive by being used as an anode in an alkaline solution and that this quality is highly increased by precipitating on the iron a layer of high oxidation potential, such as lead peroxide. Attempts have been made to utilize this condition for technical purposes in order to protect the iron against rusting. If a solution of, for instance, lead nitrate be electrolyzed, there is formed on the anode a layer of lead peroxide, but after a relatively short period such a bath will be acidified by the liberated nitric acid which attacks the objects used as the anode and is gradually reduced to nitrous acid so that finally no further precipitation of peroxide occurs.

By using as an electrolyte a solution obtained by boiling lead oxide in a concentrated alkali solution great inconveniences soon occur which make the process inapplicable for technical use, such inconveniences principally consisting in this that the tension will be exposed to strong variations, an evolution of gases occurs and a slimy mixture of hydrates of lead of different stages of oxidation is formed.

It has now been discovered that such layers of a high oxidation potential may be precipitated on the anodes very easily without any disturbing actions or variations of the tensions by using as an electrolyte an alkaline solution of a lead, manganese or other metal salt of a hydroxy carboxylic acid, which metal is adapted to form peroxides. Amongst such acids the tartaric acid is preferred due to its relatively low price.

The present invention therefore has for its object to provide an electrogalvanic method of applying protective layers to electric conductors, especially metals, which consists in using said conductors as an anode in an alkaline solution, including ammonical hydroxy carboxylic acid of a salt of a metal adapted to form peroxide. The preferred salts used in carrying the invention into practice are lead or manganese salts of hydroxy carboxylic acids, especially of tartaric acid, but also such salts of other metals adapted to form peroxides may be used such as nickel, cobalt, bismuth.

The bath to be electrolized may be prepared as follows:

A solution of a lead salt, such as lead acetate or nitrate, is added with a solution of a tartrate of an alkali metal, such as sodium-potassium tartrate. The precipitation thus formed, which in a dry state is a white fine crystalline powder, corresponding to the empiric formula PbTa, is washed by repeated decantations and is finally suspended in water, whereupon a solution of about 10% of an alkali such as NaOH or ammonia is added in slight excess until a clear solution is formed. A complex alkali-lead compound of tartaric acid is thereby formed.

Another method of obtaining such a solution which can be more easily executed consists in shaking a solution of a tartrate of an alkali metal to which has been added a suitable quantity of finely pulverized lead oxide or lead hydrate. If for instance a solution containing 50 grams of sodium-potassium tartrate per litre is shaken together with a suitable quantity of finely pulverized lead oxide an alkaline solution is obtained which contains about 30 grams of lead in solution per litre. The dissolving takes place more rapidly if at the beginning an alkali is added and the mixture heated. The obtaining of a corresponding solution of manganese is more difficult, and, moreover, such a solution has a tendency of being oxidized by the air.

For technical purposes the bath may be produced in the following manner, the quantities of the ingredients as well as the method itself being only given as examples:

Example 1.

150 grams of pure sodium hydrate are dissolved in 10 litres of distilled water, whereupon after stirring 450 grams of potassium bitartrate are added. When this salt has been dissolved 400-500 grams of finely pulverized lead oxide are added and the mixture stirred. Together with said oxide one may add manganese oxide or manganese hydrate. The mixture is then vigorously stirred from time to time while being heated, if desired, until most of the lead has dissolved. After the undissolved residue has settled to the bottom the bath is ready for use.

Example II.

The bath may be composed as follows: 10 litres of water, 500 grams of sodium-potassium tartrate, 50–100 grams of sodium hydrate, 400–500 grams of finely pulverized lead oxide.

On executing the method one may use as a cathode plates of iron or other suitable metal of convenient shape and size and as an anode the objects on which the protective layer is to be precipitated. The objects used as the anode are freed from fat and carefully purified in any convenient manner before being placed into the bath. If the anode consists of iron it may be conveniently treated with a 10% solution of nitric acid and the remaining carbon may be removed by brushing or in any other convenient manner. The objects may also be purified by subjecting them to the action of sand blast in which case the surface will be more smooth than by using chemical agents. Generally the result will be best if the anode-objects are made matte in some way or other.

When the layer has received the desired thickness the objects are rapidly removed from the bath, flushed with a stream of water which should first be cold and then hot, and finally they are dried. By suitably adapting the length of the period during which the objects are exposed to the galvanic action a perfectly even and rigidly adhering layer or cover is obtained on the objects used as the anode. Said layer has a dark-blue or dark-gray colour and consists of hydratic peroxide of lead or manganese.

The above described method which is well adapted for working on a technical scale makes it possible to apply on objects of iron or other metals or other electric conductors, such as carbon, a protective layer or cover which will protect the objects against the corrosive action of the atmosphere, of acids, gases and other agents. Objects of iron, for instance, will in this manner be protected against rusting. The layer or cover thus obtained will obtain a deep black colour if the objects are provided with a cover of pyroxyline varnish or dipped into a solution of paraffin, wax or similar substances. For obtaining covers of greater thickness, for instance on objects adapted to be used as or in connection with electrodes a considerably longer period is of course required than in case of producing a cover protecting against rust.

Whenever the process is interrupted, for instance at the end of a day the undissolved lead oxide on the bottom of the vessel is stirred in the liquid until the latter contains the original amount of lead in solution. Fresh oxide of lead is introduced into the liquid only when the undissolved quantity on the bottom of the vessel has been consumed.

I claim:

1. Electrogalvanic method of applying a protective layer of high oxidation potential on electric conductors, especially materials, consisting in using said conductors as an anode in an alkaline solution of an oxi carbonic acid salt of a metal adapted to form peroxides.

2. Electrogalvanic method of applying protective covers on electric conductors especially metals, consisting in using said conductors as an anode in an alkaline solution of a lead salt of a hydroxy carboxylic acid.

3. Electrogalvanic method of applying protective covers on electric conductors especially metals, consisting in using said conductors as anode in an alkaline solution of a lead salt of tartaric acid.

4. Electrogalvanic method of applying protective covers on electric conductors especially metals consisting in using said conductors as an anode in an alkaline solution of a lead salt of an oxi carbonic acid and in subjecting the same to a bath consisting of a solution of a lead compound in an alkaline tartaric solution.

5. Electrolytic bath adapted to be used in executing the method set forth in claim 2, consisting of a solution of a lead compound in alkali tartrate solution to which has been added an alkali.

6. Electrolytic bath adapted to be used in executing the method set forth in claim 2, consisting of a solution of a mixture of a lead compound and a manganese compound in an alkali tartrate solution.

In testimony whereof I have affixed my signature.

JONAS HJALMAR MELLQUIST.